(12) United States Patent
Asif Bashir et al.

(10) Patent No.: US 12,057,145 B2
(45) Date of Patent: Aug. 6, 2024

(54) MAGNETIC RECORDING HEADS HAVING ONE OR MORE DUSTING LAYERS FOR MAGNETIC RECORDING DEVICES

(71) Applicant: Western Digital Technologies, Inc., San Jose, CA (US)

(72) Inventors: Muhammad Asif Bashir, San Jose, CA (US); Alexander Goncharov, Morgan Hill, CA (US); Petrus Antonius Van Der Heijden, Cupertino, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/351,344

(22) Filed: Jul. 12, 2023

(65) Prior Publication Data

US 2024/0144961 A1    May 2, 2024

Related U.S. Application Data

(60) Provisional application No. 63/416,211, filed on Oct. 14, 2022.

(51) Int. Cl.
| | |
|---|---|
| *G11B 5/235* | (2006.01) |
| *G11B 5/127* | (2006.01) |
| *G11B 5/31* | (2006.01) |
| *G11B 5/00* | (2006.01) |

(52) U.S. Cl.
CPC ............ *G11B 5/235* (2013.01); *G11B 5/1278* (2013.01); *G11B 5/3109* (2013.01); *G11B 5/314* (2013.01); *G11B 5/3146* (2013.01); *G11B 2005/0024* (2013.01)

(58) Field of Classification Search
None
See application file for complete search history.

(56) References Cited

U.S. PATENT DOCUMENTS

| | | |
|---|---|---|
| 9,064,508 B1 | 6/2015 | Shiimoto et al. |
| 9,305,574 B1 | 4/2016 | Nagasaka et al. |
| 11,011,190 B2 | 5/2021 | Olson et al. |
| (Continued) | | |

OTHER PUBLICATIONS

Tagawa, Ikuya, "Negative Spin-Polarization Tri-Layer STO for MAMR" Electrical and Electronic Engineering, Tohoku Institute of Technology, 35-1 Yagiyama-Kasumicho, Sendai 982-8577, Japan, Oct. 28, 2021.

*Primary Examiner* — Craig A. Renner
(74) *Attorney, Agent, or Firm* — PATTERSON + SHERIDAN, LLP (57) ABSTRACT

Embodiments of the present disclosure relate to magnetic recording heads (e.g., magnetic write heads) for magnetic recording devices (e.g., hard disk drives (HDD's)). A magnetic recording head includes, in a gap between a write pole and a trailing shield: a spin polarization layer (SPL), a free layer, and a spacer layer between the SPL and free layer. A spin torque layer (STL) is additionally included, and is separated from the free layer by a barrier layer that reduces or eliminates spin torque between the free layer and the STL. In one or more embodiments, to enable a thinner barrier layer, one or more dusting layers are inserted between the write pole and the trailing shield, and the one or more dusting layers are each formed of iron-chromium (FeCr). This helps maintain a thinner or narrower material stack in the gap and enhances writer performance.

18 Claims, 9 Drawing Sheets

(56) References Cited

U.S. PATENT DOCUMENTS

| | | |
|---|---|---|
| 11,043,234 B2 | 6/2021 | Wu |
| 2014/0146420 A1* | 5/2014 | Shimizu et al. ....... G11B 5/314 360/125.28 |
| 2016/0218728 A1* | 7/2016 | Zhu ...................... G11B 5/3146 |
| 2017/0309301 A1* | 10/2017 | Takahashi et al. .. G11B 5/3146 |
| 2019/0244635 A1 | 8/2019 | Goncharov et al. |
| 2021/0375312 A1 | 12/2021 | Narita et al. |
| 2022/0068299 A1 | 3/2022 | Iwasaki et al. |
| 2022/0084545 A1 | 3/2022 | Wu |
| 2022/0148619 A1 | 5/2022 | Freitag et al. |
| 2024/0029759 A1* | 1/2024 | Chen et al. .......... G11B 5/3146 |

\* cited by examiner

MAGNETIC RECORDING HEADS HAVING ONE OR MORE DUSTING LAYERS FOR MAGNETIC RECORDING DEVICES

CROSS-REFERENCE TO RELATED APPLICATIONS

This application claims benefit of U.S. Provisional Patent Application Ser. No. 63/416,211, filed Oct. 14, 2022, which is herein incorporated by reference.

BACKGROUND OF THE DISCLOSURE

Field of the Disclosure

Embodiments of the present disclosure relate to magnetic recording heads (e.g., magnetic write heads) for magnetic recording devices (e.g., hard disk drives (HDD's)).

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer. There is a need for higher recording density of a magnetic recording medium (such as recording densities exceeding 2 Tbit/in$^2$ for a magnetic recording medium) to increase the function and the capability of a computer.

Magnetic flipping can be used in recording operations, such as perpendicular magnetic recording (PMR) in magnetic recording hard disk drives, where the recorded bits are stored in a perpendicular or out-of-plane orientation in a magnetic recording layer of the disk. Spin torque may be used as part of magnetic flipping operations but spin torque acting on certain layers should be reduced or eliminated, otherwise recording performance can be hindered.

However, challenges can arise. For example, spin torque blocking layers can be relatively large in thickness, and such a thickness can increase as recording capacities increase. Such large thicknesses can increase trailing gap sizes (and recording device sizes) and can hinder recording performance. Moreover, spin torque blocking layers can fail to reduce or eliminate certain cross-track forces that may arise (such as across the spin torque blocking layers), which can hinder recording performance.

Therefore, there is a need for magnetic recording heads that simply and effectively facilitate reduced or eliminated spin-torque applied to certain layers while facilitating relatively small layer thicknesses and enhanced recording performance.

SUMMARY OF THE DISCLOSURE

Embodiments of the present disclosure relate to magnetic recording heads (e.g., magnetic write heads) for magnetic recording devices (e.g., hard disk drives (HDD's)). A magnetic recording head includes, in a gap between a write pole and a trailing shield: a spin polarization layer (SPL), a free layer, and a spacer layer between the SPL and free layer. A spin torque layer (STL) is additionally included, and is separated from the free layer by a barrier layer that reduces or eliminates spin torque between the free layer and the STL. In one or more embodiments, to enable a thinner barrier layer, one or more dusting layers are inserted between the write pole and the trailing shield, and the one or more dusting layers are each formed of iron-chromium (FeCr). This helps maintain a thinner or narrower material stack in the gap and enhances writer performance.

In one embodiment, a magnetic recording head includes a write pole, a trailing shield, and a spin polarizing layer (SPL) between the write pole and the trailing shield. The SPL is ferromagnetic. The magnetic recording head includes a free layer between the write pole and the trailing shield. The free layer is ferromagnetic. The magnetic recording head includes a nonmagnetic spacer layer between the SPL and free layer. The magnetic recording head includes a spin torque layer (STL) between the write pole and the trailing shield. The STL is ferromagnetic and a magnetization of the STL is flippable. The magnetic recording head includes a barrier layer between the free layer and the STL. The barrier layer is nonmagnetic. The magnetic recording head includes one or more dusting layers between the write pole and the trailing shield. The one or more dusting layers are each formed of iron-chromium (FeCr).

In one embodiment, a magnetic recording head includes a write pole, a trailing shield, and a first ferromagnetic layer between the write pole and the trailing shield. The magnetic recording head includes a second ferromagnetic layer between the write pole and the trailing shield, a third ferromagnetic layer between the write pole and the trailing shield, and a nonmagnetic spacer layer between the first ferromagnetic layer and the third ferromagnetic layer. The magnetic recording head includes a barrier layer between the first ferromagnetic layer and the second ferromagnetic layer. The barrier layer is nonmagnetic. The magnetic recording head includes one or more dusting layers between the write pole and the trailing shield. The one or more dusting layers are each formed of iron-chromium (FeCr). The magnetic recording head includes electrical circuitry coupled to one or more of the write pole or the trailing shield and configured to generate electron flow between the first ferromagnetic layer and the third ferromagnetic layer. The first ferromagnetic layer is a free layer, the second ferromagnetic layer is a spin torque layer (STL), and the third ferromagnetic layer is a spin polarizing layer (SPL).

In one embodiment, a magnetic recording head includes a write pole, a trailing shield, and a spin polarizing layer (SPL) between the write pole and the trailing shield. The SPL is ferromagnetic. The magnetic recording head includes a free layer between the write pole and the trailing shield. The free layer is ferromagnetic. The magnetic recording head includes a nonmagnetic spacer layer between the SPL and free layer. The magnetic recording head includes a spin torque layer (STL) between the write pole and the trailing shield. The STL is ferromagnetic and a magnetization of the STL is flippable. The magnetic recording head includes a spin torque reducing means between the free layer and the STL for reducing or eliminating spin torque applied to the STL. The magnetic recording head includes one or more dusting layers between the write pole and the trailing shield. The one or more dusting layers are each formed of iron-chromium (FeCr).

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Embodiments of the present disclosure relate to magnetic recording heads (e.g., magnetic write heads) for magnetic recording devices (e.g., hard disk drives (HDD's)). In one embodiment, a magnetic recording head includes a write pole, a trailing shield, and a spin polarizing layer (SPL) between the write pole and the trailing shield. The SPL is ferromagnetic. The magnetic recording head includes a free layer between the write pole and the trailing shield. The free layer is ferromagnetic. The magnetic recording head includes a nonmagnetic spacer layer between the SPL and free layer. The magnetic recording head includes a spin torque layer (STL) between the write pole and the trailing shield. The STL is ferromagnetic and a magnetization of the STL is flippable. The magnetic recording head includes a spin polarizing layer (SPL) between the write pole and the trailing shield. The SPL is ferromagnetic. The magnetic recording head includes a barrier layer between the free layer and the STL. The barrier layer is nonmagnetic. The magnetic recording head includes one or more dusting layers between the write pole and the trailing shield. The one or more dusting layers are each formed of iron-chromium (FeCr).

Aspects of the present disclosure (such as aspects of the one or more dusting layers) simply and effectively facilitate reduced or eliminated spin-torque applied to certain layers (such as the barrier layer between the STL and the free layer), which facilitates recording performance. Aspects also facilitate relatively small layer thicknesses, which facilitate smaller trailing gap sizes and device sizes, reduced footprints, and increased recording capacities. Aspects also facilitate reduced or eliminated cross-track forces in certain layers (such as across the barrier layer).

Aspects of the present disclosure relate to data storage devices using, for example, a write head. The write head can be an energy-assisted magnetic recording (EAMR) write head, a microwave-assisted magnetic recording (MAMR) write head, or a heat-assisted magnetic recording (HAMR) write head.

Unless specified otherwise, the chemicals referred to herein can have any number of atoms for the elements included (e.g., stoichiometric or non-stoichiometric).

Figure 1:
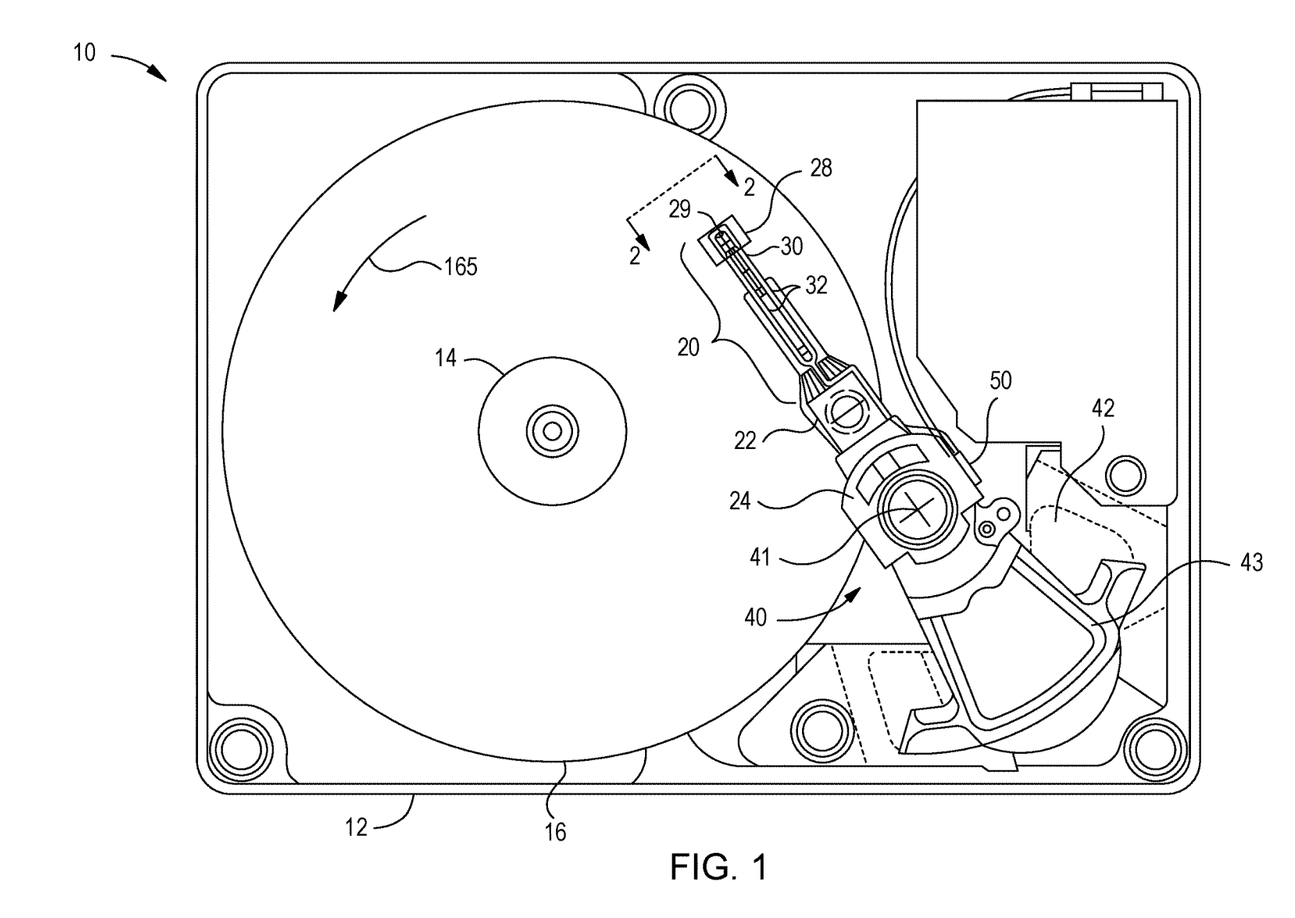
FIG. 1 is a schematic top plan view of a head/disk assembly of a hard disk drive 10 with the cover removed, according to one implementation.

FIG. 1 is a schematic top plan view of a head/disk assembly of a hard disk drive 10 with the cover removed, according to one implementation. The hard disk drive 10 may function as a microwave-assisted magnetic recording (MAMR) disk drive. The hard disk drive 10 includes a rigid base 12 supporting a spindle 14 that supports a stack of disks, including top disk 16. The spindle 14 is rotated by a spindle motor (not shown) for rotating the disks in the direction indicated by arrow 165. The hard disk drive 10 has one or more load beam assemblies 20 having an integrated lead suspension (ILS) or flexure 30 with an array 32 of electrically conductive interconnect traces or lines. The one or more load beam assemblies 20 are attached to rigid arms 22 connected to an E-shaped support structure, sometimes called an E-block 24. Each flexure 30 is attached to a slider 28 (e.g., a gas-bearing slider). A magnetic recording read-write head 29 is located at the end or trailing surface of slider 28. In one or more embodiments the read-write head 29 includes a spin-torque oscillator (STO). The flexure 30 enables the slider 28 to "pitch" and "roll" on a gas-bearing (typically air or helium) generated by the rotating disk 16. The hard disk drive 10 also includes a rotary actuator assembly 40 rotationally mounted to the rigid base 12 at a pivot point 41. The actuator assembly 40 is a voice coil motor (VCM) actuator that includes a magnet assembly 42 fixed to the base 12 and a voice coil 43. When energized by control circuitry, the voice coil 43 moves and thereby rotates E-block 24 with attached arms 22 and one or more load beam assemblies 20 to position the read-write heads 29 to the data tracks on the disks. The trace interconnect array 32 connects at one end to the read-write head 29 and at its other end to read/write circuitry contained in an electrical module or chip 50 secured to a side of the E-block 24. The chip 50 includes a read preamplifier and a write driver circuit.

Figure 2A:
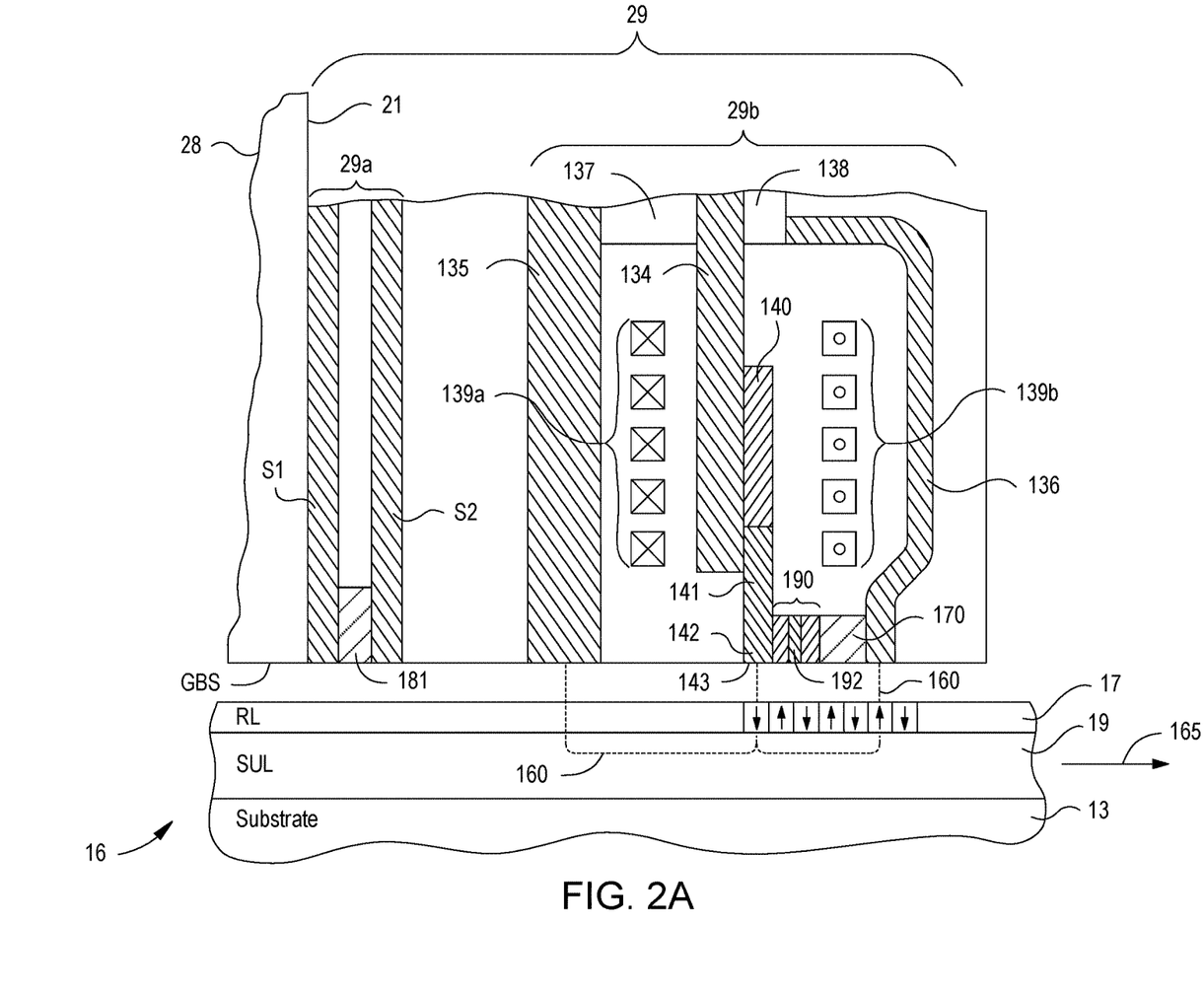
FIG. 2A is a schematic side sectional view of a perpendicular magnetic recording write head 29b with an STO 190, a read head 29a, and a recording disk 16, according to one implementation.

FIG. 2A is a schematic side sectional view of a perpendicular magnetic recording write head 29b with an STO 190, a read head 29a, and a recording disk 16, according to one implementation. The view shown in FIG. 2A is taken through a central plane that intersects a data track on the disk. As shown in FIG. 2A, a "dual-layer" disk 16 includes a perpendicular magnetic data recording layer (RL) 17 on a "soft" or relatively low-coercivity magnetically permeable underlayer (SUL) 19 formed on the disk substrate 13. The read-write head 29 is formed on slider 28 and includes the read head 29a and the write head 29b. The read head 29a includes a magnetoresistive (MR) read element or sensor 181 located between two magnetic shields S1, S2. The write head 29b is a single write pole type of perpendicular magnetic recording (PMR) write head and includes a yoke structure with a main pole 134, a write pole 140, a first flux return pole 135, a second flux return pole 136, a trailing shield 170 that is magnetic, the STO 190 between the write pole 140 and the trailing shield 170, and one or more yoke studs 137, 138 respectively connecting the main pole 134 and the return poles 135, 136. The write head 29b includes a thin film coil 139a, 139b (e.g., a write coil) shown in section around main pole 134. The write coil 139a, 139b can be a helical coil wrapped around main pole 134, or the write coil may be a dual "pancake" coil in which all the coil sections are in substantially the same plane and wrapped around the yoke. A flared write pole (WP) 140 is part of the main pole 134 and has a flared portion 141 and a pole tip 142 with an end 143 that faces an outer surface of the disk 16. Write current through the write coil 139a, 139b induces a magnetic field (shown by dashed line 160) from the WP 140 that passes through the RL 17 (to magnetize the region of the RL 17 beneath the WP 140), through the flux return path provided by the SUL 19, and back to ends 35a, 36a of the return poles 135, 136, respectively.

The read-write head 29 is formed as a series of thin films deposited on a trailing surface 21 of the gas-bearing slider 28. The slider 28 includes a media facing surface (MFS) supported above the surface of the disk 16. The MFS can be a gas-bearing surface (GBS), such as an air bearing surface (ABS). The MR read head 29a includes an MR sensor 181 located between a first MR shield S1 and a second MR shield S2. In one or more embodiments, the MR read head 29a is deposited on the trailing surface 21 (e.g., a trailing end) of the slider 28 prior to the deposition of the layers that form the write head 29b. In FIG. 2A, the disk 16 moves past the write head 29b in the direction indicated by arrow 165, so the portion of the slider 28 that supports the read head 29a and write head 29b can be called the slider "trailing" end, and the surface 21 perpendicular to the MFS. The surface 21 on which the write head 29b is located can be called the slider "trailing" surface.

The RL 17 is illustrated with perpendicularly recorded or magnetized regions, with adjacent regions having opposite magnetization directions, as represented by the arrows. The magnetic transitions between adjacent oppositely-directed magnetized regions are detectable by the MR sensor 181 as the recorded bits.

As shown in FIG. 2A, a trailing shield (TS) 170 is spaced from the WP 140. The TS 170 is formed of a ferromagnetic material. The STO 190 is located between the WP 140 and the TS 170. The STO 190 includes a ferromagnetic layer 192. A magnetization of the ferromagnetic layer 192 precesses in the presence of DC current from electrical circuitry coupled to the WP 140 and the TS 170. A seed layer can be located between the WP 140 and the STO 190 and/or a capping layer can be located between STO 190 and TS 170.

Figure 2B:
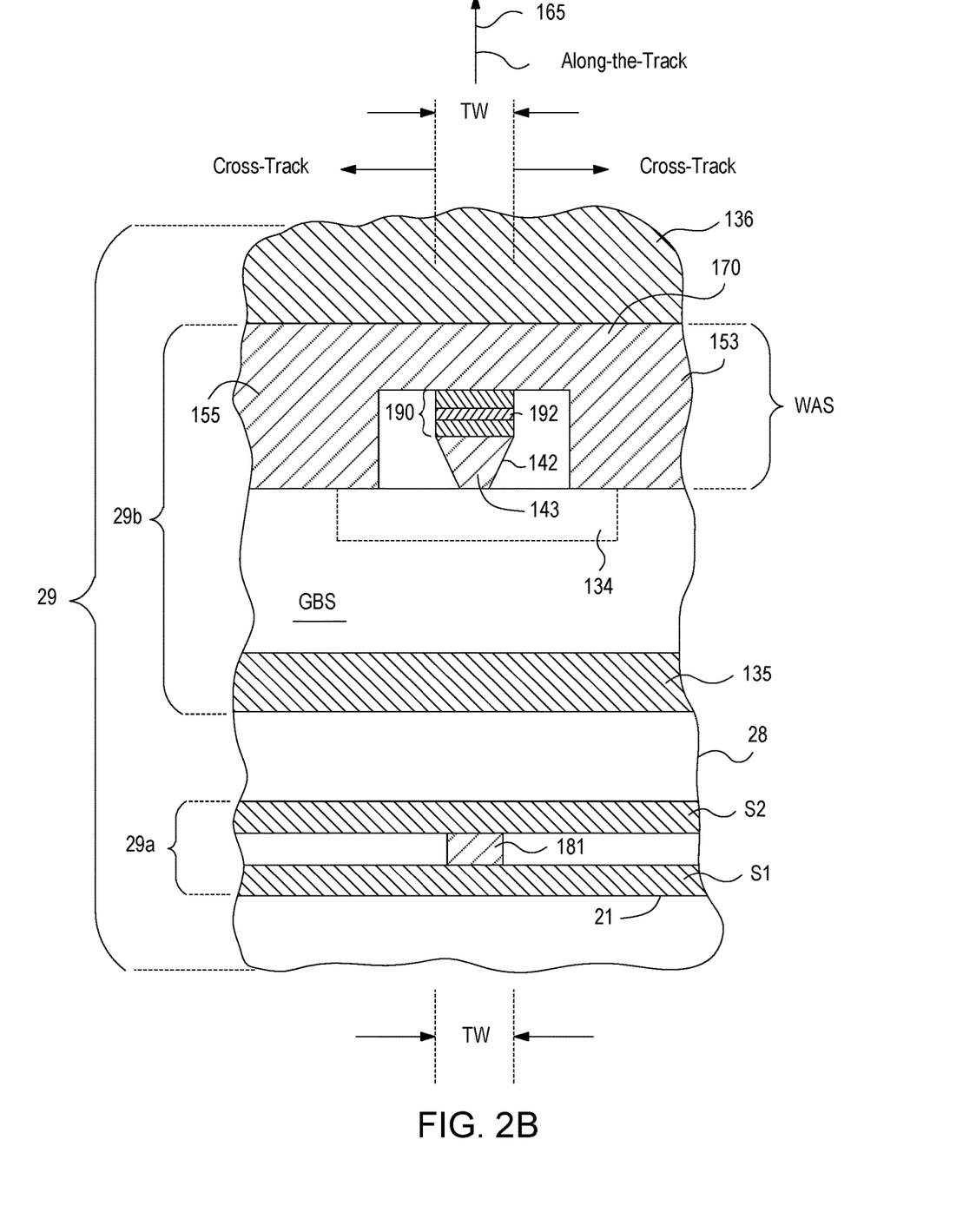
FIG. 2B is a schematic view of the media facing surface (MFS) of the read-write head 29, according to one implementation.

FIG. 2B is a schematic view of the media facing surface (MFS) of the read-write head 29, according to one implementation. The MFS can be seen, for example, from the disk 16. The MFS is the recording-layer-facing surface of the slider 28 that faces the disk 16 (shown, for example, in FIG. 2A) and is shown without a thin protective overcoat that can be included for a slider. The recording-layer-facing surface can refer to the surface of the slider 28 that is covered with a thin protective overcoat, the actual outer surface of the slider if there is no overcoat, or the outer surface of the overcoat. The disk 16 (see FIG. 2A) moves relative to the read-write head 29 in the direction 165, which can be referred to as the downtrack direction. The direction perpendicular to direction 165 and parallel to the plane of the MFS can be referred to as the cross-track direction. The direction perpendicular to the direction 165 and perpendicular to the plane of the MFS can be referred to as the stripe height direction. The width of the end 143 of WP tip 142 in the cross-track direction substantially defines the track-width (TW) of the data tracks in the RL 17 (FIG. 2A). The main pole 134 is shown with dashed lines because the main pole 134 is recessed from the MFS.

The portions identified as 153, 155 on opposite ends of TS 170 are side shields that together with TS 170 form a wraparound shield (WAS) that generally surrounds the WP tip 142. The shields 170, 153, 155 all have ends at the recording-layer-facing surface or recessed from the recording-layer-facing surface. The shields 170, 153, 155 can be formed as a single-piece structure to form the WAS that substantially surrounds the WP tip 142. The shields 170, 153, 155 can be formed of the same material, such as an alloy material that includes one or more of NiFe, CoFe and/or NiFeCo, such that the shields 170, 153, 155 have the same alloy composition. The side shields 153, 155 are separated from WP tip 142 by nonmagnetic gap material. The STO 190 is located between the WP tip 142 and the TS 170. The WAS can alter the angle of the write field and improve the write field gradient at the point of writing, and can shield the writing field at regions of the RL away from the track being written. The WAS is shown as connected to the return pole 136. The WAS may be a "floating" WAS shield not connected to either the return pole 136 or other portions of the yoke by flux-conducting material. Also, instead of a WAS, the write head 29b may have separate side shields not connected to the TS 170. For example, the side shields can include a first side shield 153 and a second side shield 155, in addition to the TS 170.

Figure 3:
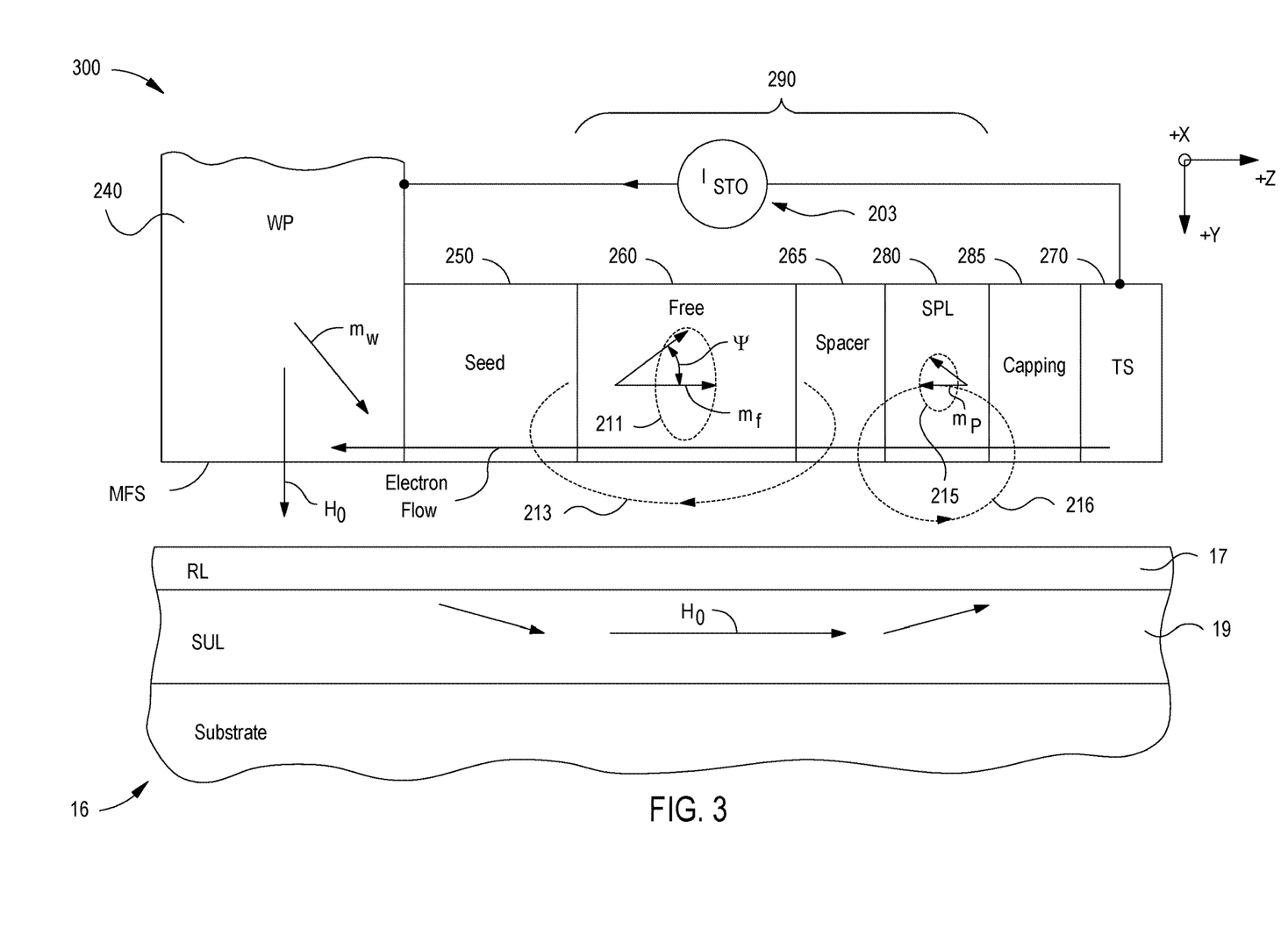
FIG. 3 is a schematic side sectional view of a magnetic recording head 300 (e.g., a MAMR write head) having a spin-torque oscillator (STO) 290, according to one implementation.

FIG. 3 is a schematic side sectional view of a magnetic recording head 300 (e.g., a MAMR write head) having a spin-torque oscillator (STO) 290, according to one implementation. Electrical circuitry 203 is coupled to one or more of the WP 240 and/or the TS 270. The electrical circuitry 203 is configured to provide—during writing operations—DC current $I_{STO}$ between the WP 240 and the TS 270, and generate electron flow in the opposite direction, from the TS 270 to the WP 240. The electrons flow, inter alia, between the free layer 260 and the WP 240. The WP 240 has a magnetization ($m_w$) and is depicted as generating a write field ($H_0$) perpendicularly into the RL 17. The STO 290 includes a free layer 260 that is ferromagnetic and has an edge substantially at the MFS. The free layer 260 has a magnetization ($m_f$). The free layer 260 can be referred to as a field generation layer (FGL). The free layer 260 may be formed of high moment ferromagnetic materials such as one or more CoFe alloys. A nonmagnetic and electrically-conductive seed layer 250 is located between the WP 240 and the free layer 260 to facilitate crystalline growth of the free layer 260. The seed layer 250 may have a short spin diffusion length, e.g., the length over which the polarization of the electron current is destroyed due to spin flip scattering. The seed layer 250 may be formed of a layer or multilayer of metal(s) or metal alloys such as one or more of Cu, Cr, Ta, Ru, Ir, Ti, NiAl, NiTa, NiCr, Hf, and/or Nb.

A spin polarizing layer (SPL) 280 is located between the free layer 260 and the TS 270. The SPL 280 is ferromagnetic, and is formed of alloy(s) such as one or more NiFe alloys, one or more CoFe alloys, and/or one or more Heusler alloys. The SPL 280 can be formed of a material with no or relatively small perpendicular-to-the-plane magnetic anisotropy and low magnetic moment. SPL 280 has a magnetization ($m_p$). A nonmagnetic spacer layer 265 is located between the free layer 260 and the SPL 280. The nonmagnetic spacer layer 265 is formed of a material with a long spin-diffusion length, such as Cu and/or other materials such as Au, Ag and/or AgSn. A nonmagnetic electrically-conductive capping layer 285 may be located between the SPL 280 and the TS 270. The capping layer 285 may be formed of a layer or multilayer of metal(s) or metal alloy(s) such as one or more of Ru, Cr, Ir, Ta, Ti, NiAl, NiTa, and/or NiCr.

The stack of layers between the WP 240 and TS 270 are formed after the write pole 240 is formed, using for example deposition and lithographic techniques used in the fabrication of thin film read/write heads.

In the absence of DC current ($I_{STO}$), the magnetizations $m_f$ and $m_p$ are both parallel to the portion of the write field $H_0$ in the gap ("write gap field") between a WP 240 and a TS 270. In operation of the STO 290, DC current ($I_{STO}$), with a current density J above a critical value $J_C$, is applied across the WP 240 and the TS 270. The flow of electrons is from the TS 270, through SPL 280, and to the free layer 260. The electrons become spin polarized by the SPL 280 and apply a direct spin torque to the free layer 260. Spin-polarized electrons are reflected by the free layer 260 and apply a torque on the magnetization $m_p$ of the SPL 280, which causes $m_p$ to flip and become oriented antiparallel to the write gap field $H_0$, which is the state shown in FIG. 3. The direct and reflected spin-polarized electrons apply a spin torque to the magnetization $m_f$ of the free layer 260 and the magnetization $m_p$ of the SPL 280. The spin torque applied to the magnetizations $m_f$, $m_p$ induces a precessional motion of the magnetization $m_f$ of the free layer 260 and the magnetization $m_p$ of the SPL 280. The rotation of the SPL 280 magnetization $m_p$ about the Z-axis is depicted by the oval 215 that represents a circular precessional motion of the tip of the magnetization vector $m_p$ lying in a plane parallel to the X-Y plane. The magnetization $m_f$ of the free layer 260 makes an angle Ψ relative to the X-Z plane and has a component in the X-Y plane that rotates at an azimuthal angle about the Z-axis with a certain frequency f. The rotation of the magnetization $m_f$ of the free layer 260 about the Z-axis at the approximately fixed angle Ψ is depicted by the oval 211 that represents a circular precessional motion of the tip of the magnetization vector $m_f$ lying in a plane parallel to the X-Y plane. The frequency of precession can depend on the properties and thicknesses of the materials making up the STO 290, but for a specific STO the frequency of precession can be a function of the values of both the DC current $I_{STO}$ and the write field $H_0$ in the write gap.

During writing, a write field $H_0$ in the write gap between the WP 240 and TS 270 is applied to the magnetic grains in the recording layer RL 17. At the same time, the precession of the magnetization $m_f$ of the free layer 260 applies an auxiliary AC field to the magnetic grains in the recording layer RL 17. The write field $H_0$ and the auxiliary AC field can result in microwave-assisted magnetic recording (MAMR), which can improve the switching of the magnetization of the grains in the RL 17. Such an improvement can depend on the frequency f at which the auxiliary field is applied. Ferromagnetic materials can absorb energy from AC magnetic fields more efficiently at or near a ferromagnetic resonance frequency of the ferromagnetic materials. Accordingly, the frequency f of the auxiliary AC magnetic field from the free layer 260 of the STO 290 is designed to be preferably within a range near the ferromagnetic resonance of the magnetic material making up the grains in the RL 17, e.g., about 30-50 GHz. As a result, the write field used from a PMR write head can be reduced from what would otherwise be used to switch the magnetization of the grains in the RL 17 without MAMR. MAMR may be used to increase the coercivity of the RL 17 above that which could be written to by a PMR write head that does not use MAMR. As discussed herein, aspects described may be used with MAMR applications. The present disclosure also contemplates that aspects described herein may be used with other recording applications, such as energy-assisted magnetic recording (EAMR) applications and/or heat-assisted magnetic recording (HAMR) applications.

During operation (e.g., writing operations), the free layer 260 can produce a DC field component from magnetization $m_f$ that is proportional to $(B_s t)\cos \psi$, where $B_s$ is the saturation magnetization, t is the thickness of the free layer and $B_s t$ is the magnetic moment of the free layer 260 per unit area. Such a DC field is shown by arrow 213 can be undesirable because the DC field 213 can be in the direction away from the WP 240 toward TS 270 and can have a shunting effect on the write field $H_0$ in the write gap. The SPL 280 produces a DC field component 216 that appears to offset or counteract the DC component 213 from free layer 260, and the DC field component 216 can be relatively small because SPL 280 has a relatively low magnetic moment ($B_s t$ is much less than the $B_s t$ of free layer 260). When write current from the coil is switched, the write gap field $H_0$ is switched from the direction into the RL 17 (as shown in FIG. 3) to out of the RL 17, which results in a switching of directions of the magnetizations $m_w$, $m_p$ and $m_f$, as well as the direction of the DC field 213.

Figure 4A:
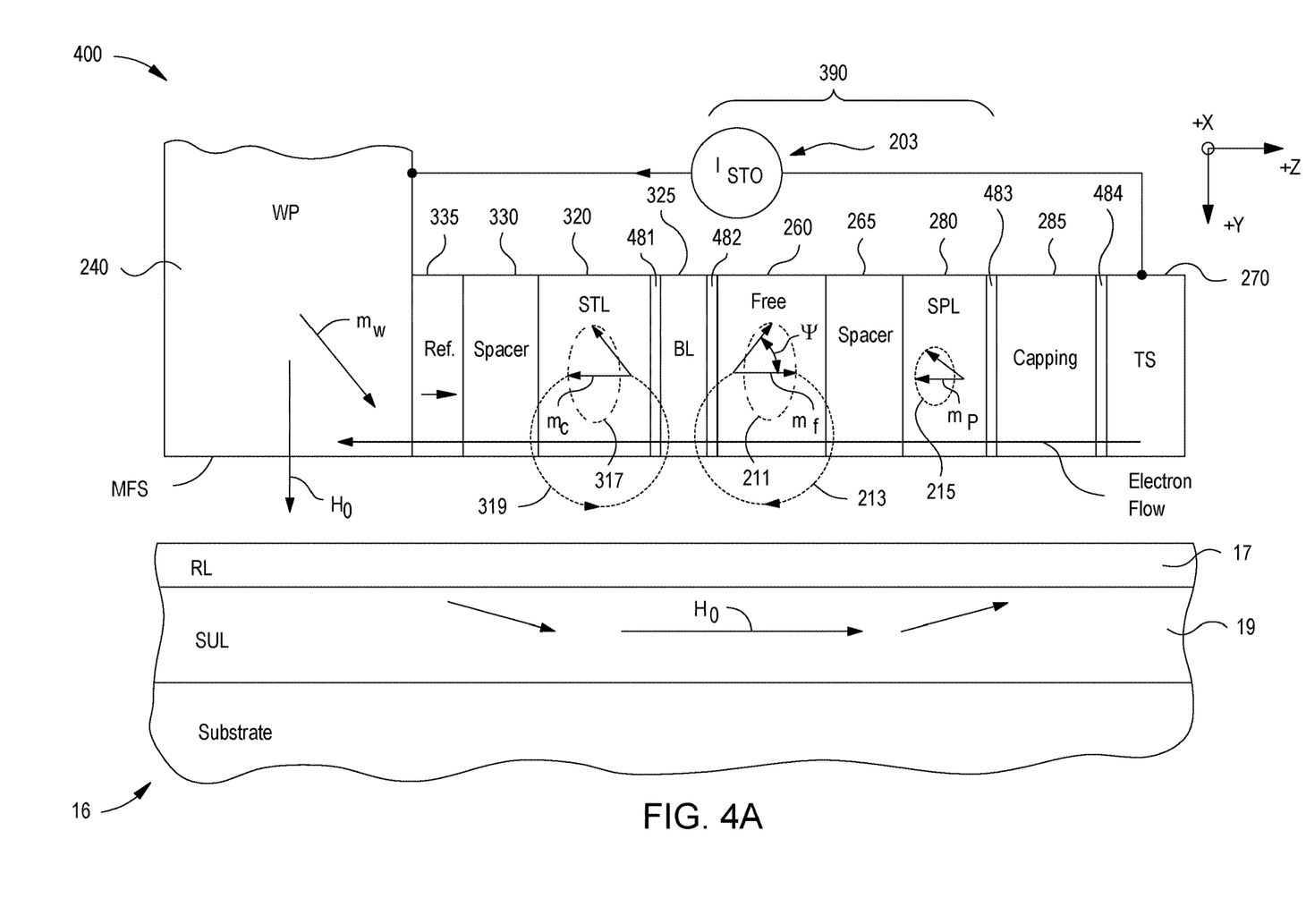
FIG. 4A is a schematic side sectional view of a magnetic recording head 400 (e.g., having a MAMR write head) with a spin-torque oscillator (STO) 390, according to one implementation.

FIG. 4A is a schematic side sectional view of a magnetic recording head 400 (e.g., having a MAMR write head) with a spin-torque oscillator (STO) 390, according to one implementation. Numeral references are reused from FIG. 3 to indicate aspects of the recording head in FIG. 3 included in the magnetic recording head 400.

The magnetic recording head 400 can be used, for example, as at least part of the write head 29b shown in FIG. 2A. The read-write head 29 may be an energy-assisted magnetic recording (EAMR) head, a microwave-assisted magnetic recording (MAMR) head, or a heat-assisted magnetic recording (HAMR) head. The present disclosure contemplates that although aspects herein are described in relation to a write head (such as the write head 29b).

It is to be understood that the magnetic recording head discussed herein is applicable to a data storage device such as a hard disk drive (HDD) as well as a tape drive such as a tape embedded drive (TED) or an insertable tape media drive. An example TED is described in the patent application titled "Tape Embedded Drive," U.S. Pat. No. 10,991,390, issued on Apr. 27, 2021, assigned to the same assignee of this application, which is herein incorporated by reference.

As such, any reference in the detailed description to an HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

Compared to FIG. 3, the magnetic recording head 400 additionally includes, among other things in various implementations, a spin torque layer (STL) 320, a barrier layer 325, a spacer 330 and a reference layer (or main pole notch layer) 335. The recording head 400 also includes one or more dusting layers 481, 482, 483, 484 between the WP 240 and the TS 270. The compositions and functions of these layers will be described below.

During writing operations, the electrical circuitry 203 provides a DC current ($I_{STO}$) between the WP 240 and the TS 270. The electron flow is in the opposite direction, from the TS 270 to the WP 240. The STL 320 is between the WP 240 and the free layer 260. The STL 320 is ferromagnetic and has a magnetization $m_c$. The magnetization $m_c$ can compensate for the DC shunting field 213 from free layer 260. The STL 320 may be formed of high moment ferromagnetic materials such as CoFe alloys, such as the materials used for the free layer 260. The STL 320 is separated from the free layer 260 by a barrier layer 325 between the free layer 260 and the barrier layer 325. The barrier layer 325 is nonmagnetic. The barrier layer 325 may have a short spin diffusion length to reduce or eliminate a spin torque applied to the magnetization of the STL 320 by spin-polarized electrons from the free layer 260. In one or more embodiments, the barrier layer 325 is formed of a material that includes one or more of Ru, Cr, Ir, Ta, Ti, NiAl, NiTa, and/or NiCr.

A nonmagnetic spacer layer 330 (which can be similar to the spacer layer 265) with a long spin-diffusion length is located between the WP 240 and the STL 320. An optional first reference layer 335 (which is ferromagnetic) may be ferromagnetically coupled to WP 240 and located between WP 240 and spacer layer 330. Reference layer 335 has a high $B_s t$ and provides spin-polarized electrons that apply a spin torque to the magnetization $m_c$ of the STL 320. The reference layer 335 may be formed of CoFe and/or one or more Heusler alloys, for example. The reference layer 335 may be referred to as a main pole notch layer.

In the absence of DC current ($I_{STO}$), the write gap field $H_0$ would be aligned parallel to the downtrack direction (e.g., parallel to the X-Z plane), and the magnetizations $m_c$, $m_f$, $m_p$ and the magnetization of reference layer 335 are all parallel to the write gap field $H_0$ (e.g., aligned parallel to the downtrack direction). For example, the magnetization $m_f$ of the free layer 260 would not precess such that the angle $\Psi$ is zero. The magnetizations $m_c$, $m_p$ of the STL 320 and the SPL 280 are each flippable such as to be antiparallel to the magnetization $m_f$ and the write gap field $H_0$, which is the state shown in FIG. 4A. In operation of the STO 390, DC current ($I_{STO}$), with a current density J above a critical value $J_C$, is applied across the WP 240 and the TS 270. The magnetizations $m_c$, $m_p$ of the STL 320 and the SPL 280 are each flippable without switching the direction of the DC current ($I_{STO}$). The flow of electrons is from the TS 270, through the SPL 280, and to the free layer 260. The operation of the STO 390 can be substantially similar to that as described above for the STO 290 in FIG. 3. The barrier layer 325 reduces or eliminates the number of spin-polarized electrons that flow between the STL 320 and the free layer 260 (e.g., from the free layer 260 and to the STL 320). Electrons that become spin-polarized by the STL 320 are reflected back from the WP 340 (or optional reference layer 335) and across the spacer layer 330, which causes the magnetization $m_c$ to flip and become substantially antiparallel to the write gap field $H_0$ and thus antiparallel to $m_f$. The reflected electrons apply a spin torque to $m_c$, which causes $m_c$ to process, as depicted by the oval 317 that represents a circular precessional motion of the tip of the magnetization vector $m_c$ lying in a plane parallel to the X-Y plane. Because $m_c$ is opposite the write gap field $H_0$, the cosine of the precession angle of $m_c$ is negative (while the cosine of the precession angle of $m_f$ is positive). The frequency of precession of $m_c$ is much higher than the frequency of precession of $m_f$ and the resonant frequency of the magnetic grains in RL 17. This can be understood by observing the effect of the cosine function on frequency from the Kittel equation:

$$f = \frac{1}{2\pi}\gamma(\mu_0 H_0 - \mu_0 M_s \cos\psi),$$

where $M_s$ is the saturation magnetization, $\Psi$ is the precession angle and $\gamma$ is the gyromagnetic ratio for the electrons. In the Kittel equation, the precession angle $\Psi$ can refer to the precession angle of any layer having a precessing magnetization (such as the STL 320, the free layer 260, or the SPL 280). In one or more embodiments, the STL 320 thus does not affect the magnetic grains and there is no microwave assistance from STL 320. However, the precessing $m_c$ of STL 320 provides a DC field 319 that is substantially parallel to the write gap field $H_0$ and thus compensates for the negative effect of the DC shunting field 213 from free layer 260. When write current from the coil is switched, the write field $H_0$ is switched from the direction into the RL 17 (as shown in FIG. 4A) to out of the RL, which results in a switching of directions of the magnetizations $m_w$, $m_p$, $m_f$, and the magnetization of reference layer 335, as well as the direction of DC field 213 (e.g., a shunting field) and DC field 319 (e.g., a compensation field). A field generated using the SPL 280 is an AC field and the field 319 generated using the STL 320 is a DC field.

As noted above, the barrier layer can reduce or eliminate a spin torque between the STL and the free layer. This reduction or elimination of spin torque is helpful in various aspects. For example, once the SPL switches against the write gap field, it would try to bring the free layer in-plane. When a torque from the free layer is applied to STL, it would take longer (and require a higher current) for the STL to switch against the gap field as discussed above. As another example, before the STL switches, with interactions, the STL would try to exert torque on the free layer, and would improve the free layer's angle for best writer assist performance. After the STL switches, with interactions, the STL would try to pull the free layer along shunting directions and reduces its angle and frequency. In these scenarios, it is ideal that no torque is applied between the free layer and the STL to yield the desired frequency and angle for improved writer performance.

A certain thickness of the barrier layer 325 may be needed to achieve the aforementioned advantages. To enable use of a thinner barrier layer 325 with comparable beneficial effects, the magnetic recording head 400 includes one or more dusting layers 481, 482, 483, 484 between the WP 240 and the TS 270. The one or more dusting layers 481, 482, 483, 484 are each formed of iron-chromium (FeCr). The one or more dusting layers include a first set of one or more FeCr layers 481, 482 between the STL 320 and the free layer 260, and a second set of one or more FeCr layers 483, 484 outwardly of the SPL 280 relative to the free layer 260. Each of the FeCr layers 481, 482, 483, 484 is a ferromagnetic layer that has a negative polarization factor. In one or more embodiments, the negative polarization factor is within a range of −0.1 to −0.4. Each of the FeCr layers 481, 482, 483, 484 has a phase that is at least partially crystalline.

The second set of the one or more FeCr layers 483, 484 may be located in different locations, depending on implementation. In the implementation shown in FIG. 4A, the second set of one or more FeCr layers 483, 484 are between the SPL 280 and the TS 270. A first FeCr layer 481 is between (and interfacing with each of) the STL 320 and the barrier layer 325. A second FeCr layer 482 is between (and interfacing with each of) the barrier layer 325 and the free layer 260. A third FeCr layer 483 is between (and interfacing with each of) the SPL 280 and the capping layer 285. A fourth FeCr layer 482 is between (and interfacing with each of) the capping layer 285 and the TS 270. The first FeCr layer 481 interfaces with a first side of the barrier layer 325 and the second FeCr layer 482 interfaces with a second side of the barrier layer 325. The third FeCr layer 483 interfaces with a first side of the capping layer 285 and the fourth FeCr layer 484 interfaces with a second side of the capping layer 285.

The barrier layer 325 and the capping layer 285 can each be referred to as a spin torque blocking layer. The one or more FeCr layers 481, 482, 483, 484 facilitate reduced thicknesses for the spin torque blocking layers and enhanced writing (e.g., PMR) performance. The reduced thicknesses facilitate reduced trailing gap sizes between the WP 240 and the TS 270, such as 24 nm or less, which facilitates device performance. The one or more FeCr layers 481, 482, 483, 484 also facilitate reduced cross-track forces acting across one or more of the spin torque blocking layers (such as the barrier layer 325). Additionally, zero torque or a negative torque is developed in one or more of the toque blocking layers (such as in the barrier layer 325 between the free layer 260 and the STL 320), which facilitates device performance and preservation of the frequency and angles of the magnetizations $m_c$, $m_f$ of the free layer 260 and the STL 320. The one or more FeCr layers 481, 482, 483, 484 also (1) reduce or eliminate effects of the SPL 280 and/or the STL 320 pulling the magnetization of the free layer 260 to be parallel to the write field and/or (2) reduce the frequency and/or angle of the magnetization of the free layer 260. Additionally, the reduced torque between the free layer 260 and the STL 320 lowers the amount of current, (e.g., the current density) needed to flip the STL 320 against the write field. Such benefits can applicable, for example, for increased storage capacities.

Figure 4B:
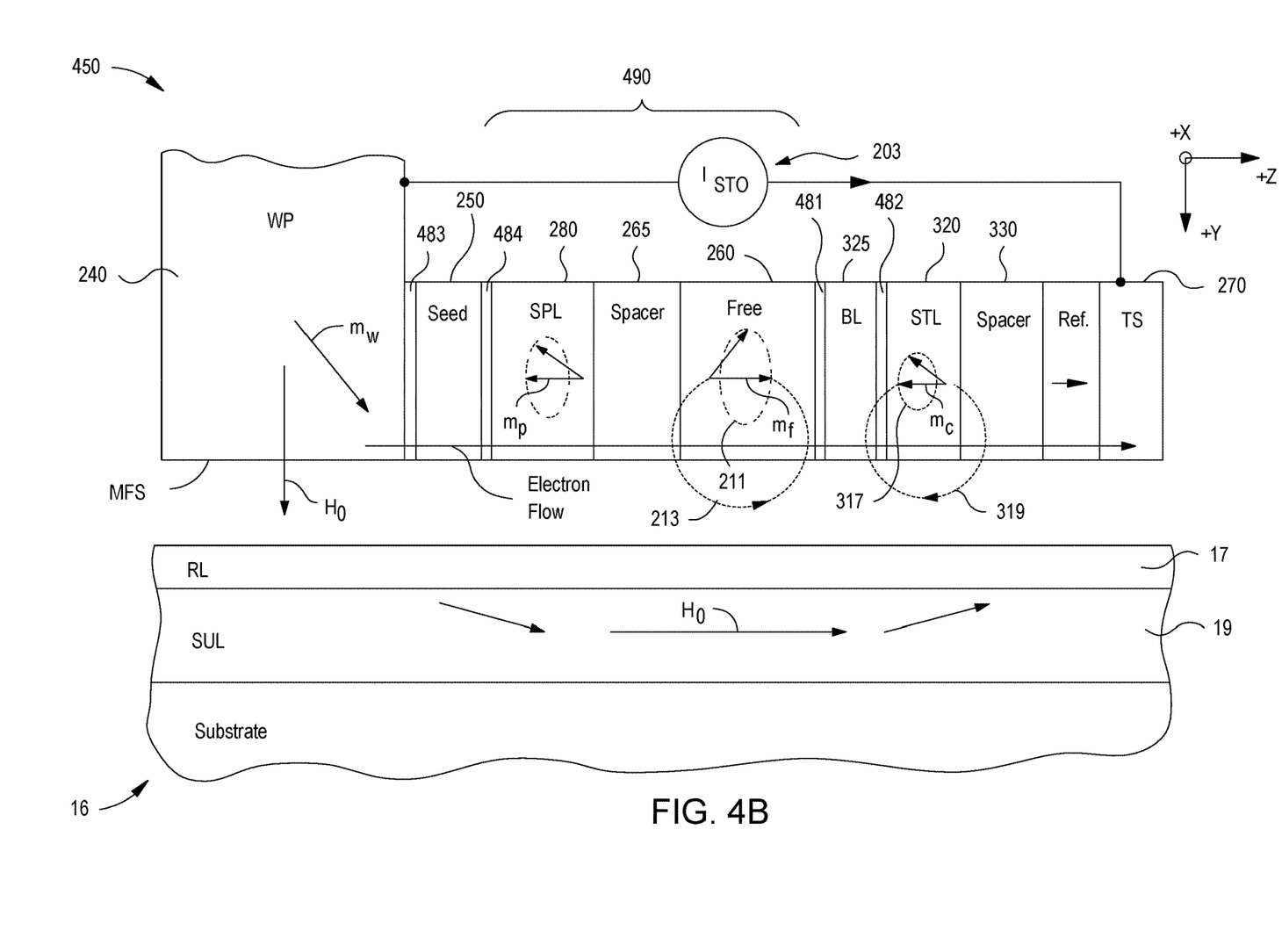
FIG. 4B is a schematic side sectional view of a magnetic recording head 450 (e.g., a MAMR write head) with a spin-torque oscillator (STO) 490, according to one implementation.

FIG. 4B is a schematic side sectional view of a magnetic recording head 450 (e.g., a MAMR write head) with a spin-torque oscillator (STO) 490, according to one implementation. The magnetic recording head 450 is similar to the magnetic recording head 400 shown in FIG. 4A, and includes one or more of the aspects, features, components, and/or properties thereof. The magnetic recording head 450 can function in a similar manner as the magnetic recording head 400 of FIG. 4A to compensate for the DC shunting field from the free layer 260. In the magnetic recording head 450 the SPL 280 and the free layer 260, which are separated by spacer layer 465, are reversed in position so that SPL 280 is nearer the WP 240.

In the implementation shown in FIG. 4B, the SPL 280 is between the WP 240 and the free layer 260, and the free layer 260 is between the SPL 280 and the STL 320. The STL 320 is between the free layer 260 and the TS 270. The seed layer 250 is between the WP 240 and the SPL 280. In the implementation shown in FIG. 4B, the second set of one or more FeCr layers 483, 484 are between the SPL 280 and the WP 240. The third FeCr layer 483 interfaces with a first side of the seed layer 250 and the fourth FeCr layer 484 interfaces with a second side of the seed layer 250.

The DC current ($I_{STO}$) direction is also switched so that electron flow is directed first to SPL 280 (as it is in the embodiment of FIG. 4A), in a direction from the WP 240 to the TS 270. In operation, the STL 320 provides a DC field 319 that is substantially parallel to the write gap field Ho. The DC field 319 is an offset field or compensation field that offsets at least a portion of the DC shunting field 213 from free layer 260.

In accordance with the present disclosure, the free layer 260 can be referred to as a first ferromagnetic layer, the STL 320 can be referred to as a second ferromagnetic layer, and the SPL 280 can be referred to as a third ferromagnetic layer.

Figure 5A:
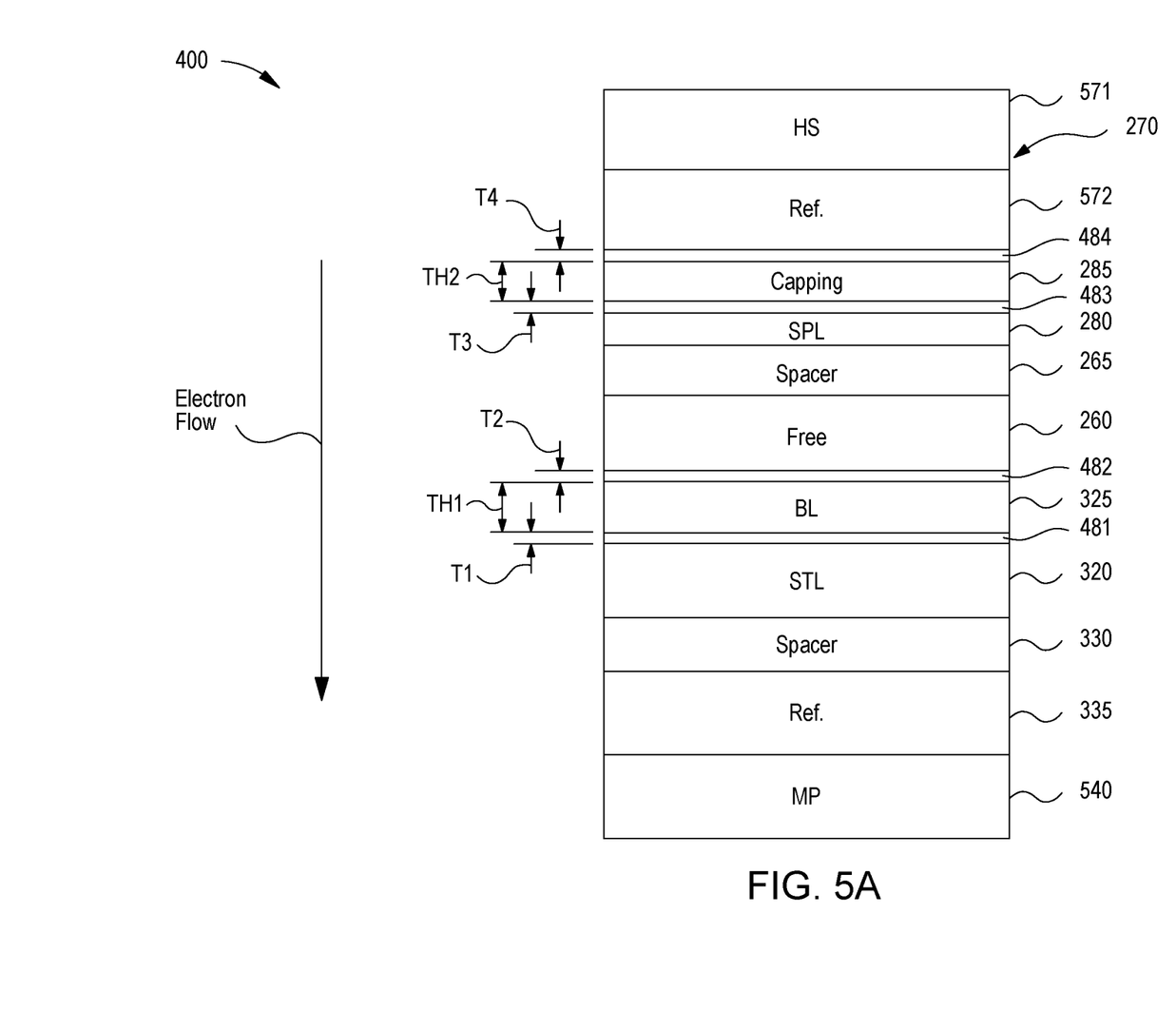
FIG. 5A is a schematic partial view of the magnetic recording head 400 shown in FIG. 4A, according to one implementation.

FIG. 5A is a schematic partial, media facing surface view of the magnetic recording head 400 shown in FIG. 4A, according to one implementation. In FIG. 5A, the write pole 240 is shown by the reference label main pole (MP) 540. The trailing shield 270 includes a hot seed layer 571 and an optional second reference layer 572 (which is ferromagnetic) that may be ferromagnetically coupled to the hot seed layer 571 and located between the hot seed layer 571 and the capping layer 285. The second reference layer 572 can have a high $B_s t$ and provide spin-polarized electrons that apply a spin torque to the magnetization $m_p$ of the SPL 280. The second reference layer 572 may be formed of CoFe and/or one or more Heusler alloys, for example. The second reference layer 572 may be referred to as a trailing shield notch layer.

Each of the first set of one or more FeCr layers 481, 482 has a thickness T1, T2 (along the downtrack direction) that is less than a thickness T3, T4 (along the downtrack direction) of each of the second set of one or more FeCr layers 483, 484. The thickness T1, T2, T3, T4 of each of the one or more dusting layers 481, 482, 483, 484 is within a range of 0.5 nm to 5.0 nm. The thickness T1, T2 of each of the first set of one or more FeCr layers 481, 482 is less than 2.0 nm (such as 1.0 nm), and the thickness T3, T4 of each of the second set of one or more FeCr layers 483, 484 is within a range of 2.0 nm to 3.0 nm. In one or more embodiments, an Fe atomic percentage of each of the one or more dusting layers 481, 482, 483, 484 is within a range of 50% to 80%, and a Cr atomic percentage of each of the one or more dusting layers 481, 482, 483, 484 is within a range of 20% to 50%. The Fe atomic percentage and the Cr atomic percentage added together equal at least 95% of a total atomic percentage for each of the one or more dusting layers 481, 482, 483, 484.

The barrier layer 325 and the capping layer 285 each have a thickness TH1, TH2 (along the downtrack direction) that is less than 5.0 nm. In one or more embodiments, each thickness TH1, TH2 is within a range of 2.0 nm to 4.0 nm, such as 3.0 nm. In the implementation shown in FIG. 5A, thicknesses (along the downtrack direction) of each of the first reference layer 335, the second reference layer 572, the free layer 260, and the STL 320 are 5.0 nm. Thicknesses (along the downtrack direction) of the spacer layers 265, 330 are each less than 5.0 nm (such as 3.0 nm or 2.5 nm), and a thickness (along the downtrack direction) of the SPL 280 is 2.0 nm.

In one or more embodiments, interfaces between magnetic layers and nonmagnetic layers of the magnetic recording head 400 each have a polarization value within a range of 0.2 to 0.7 (such as 0.6).

Figure 5B:
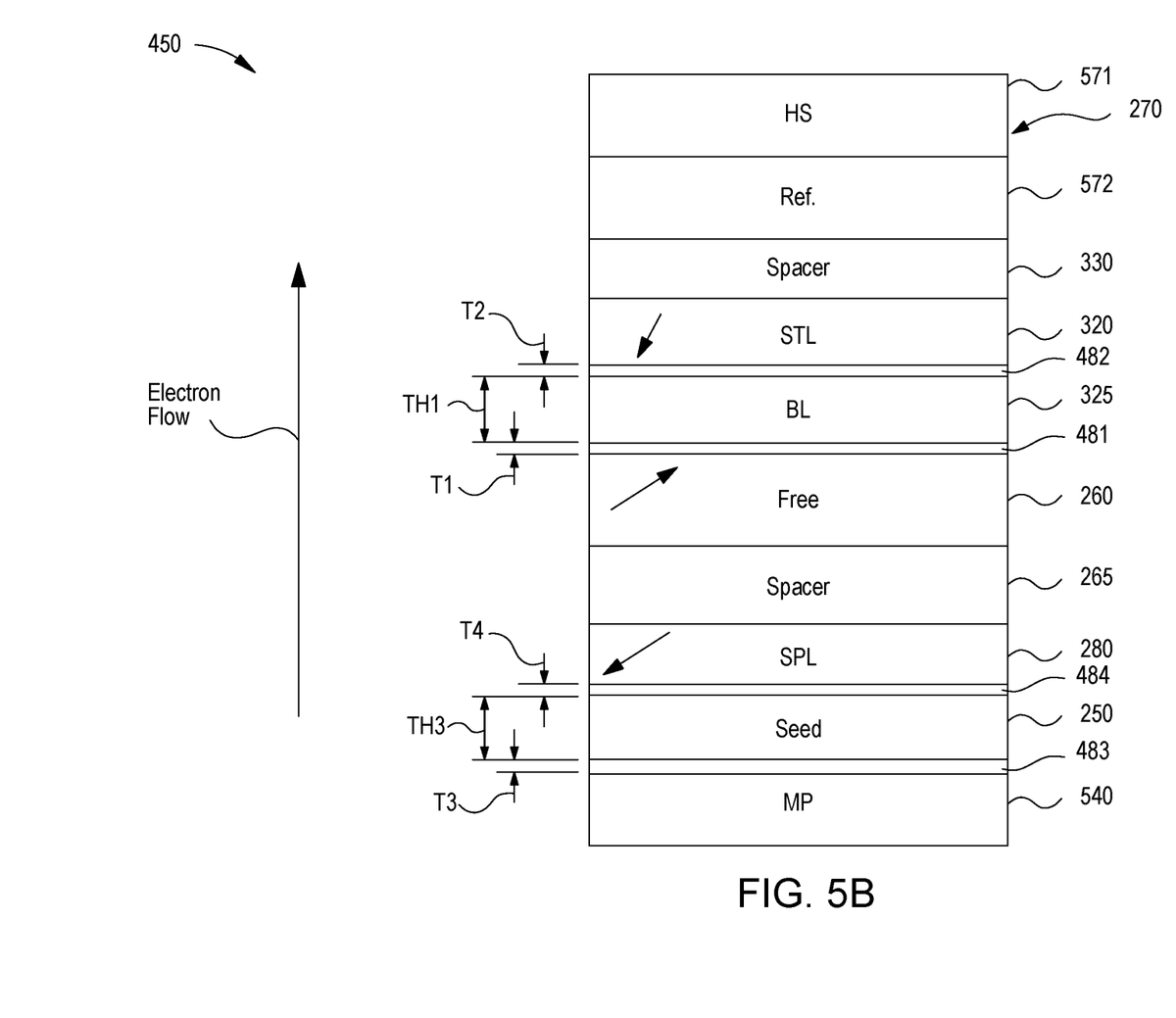
FIG. 5B is a schematic partial view of the magnetic recording head 450 shown in FIG. 4B, according to one implementation.

FIG. 5B is a schematic partial, media facing surface view of the magnetic recording head 450 shown in FIG. 4B, according to one implementation. The seed layer 250 has a thickness TH3 (along the downtrack direction) that is less than 5.0 nm. In one or more embodiments, the thickness TH3 is within a range of 2.0 nm to 4.0 nm, such as 4.0 nm. In FIG. 5B, numeral references are reused from FIG. 5A to indicate aspects in FIG. 5B included in the magnetic recording head 450. Layers having the same numbers in FIGS. 5A and 5B, unless otherwise specified, have the same properties. For example, the thicknesses T1, T2 in FIG. 5B are equal to the thicknesses T1, T2 in FIG. 5A.

The present disclosure contemplates that the first reference layer or main pole notch layer 335 (not shown in FIG. 5B) can be used and located between the third FeCr layer 483 and the main pole 540 of the magnetic recording head 450.

Figure 6A:
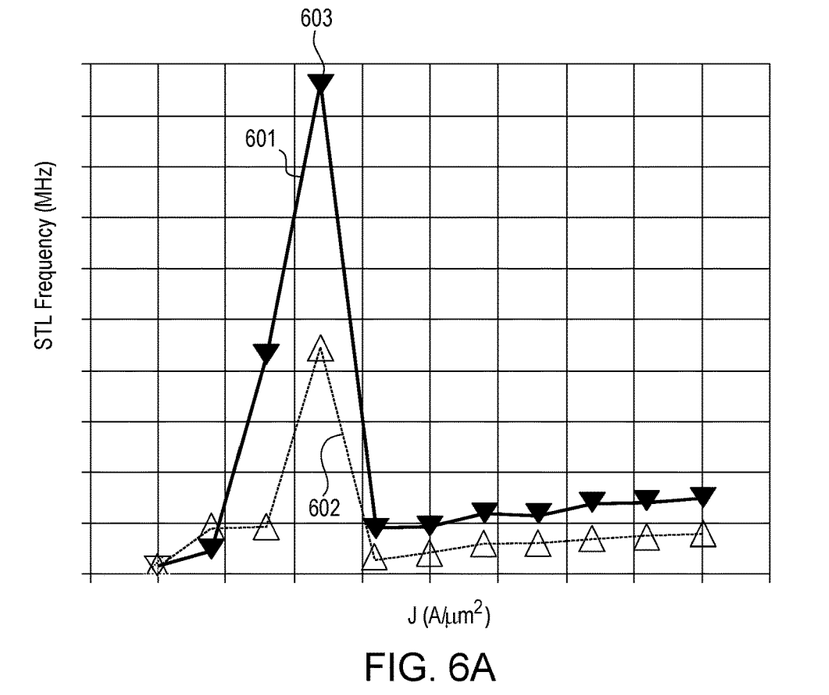
FIGS. 6A and 6B are schematic graphical views of frequency (FIG. 6A) angle (FIG. 6B) of the magnetization $m_c$ of the STL 320, according to one implementation.
Figure 6B:
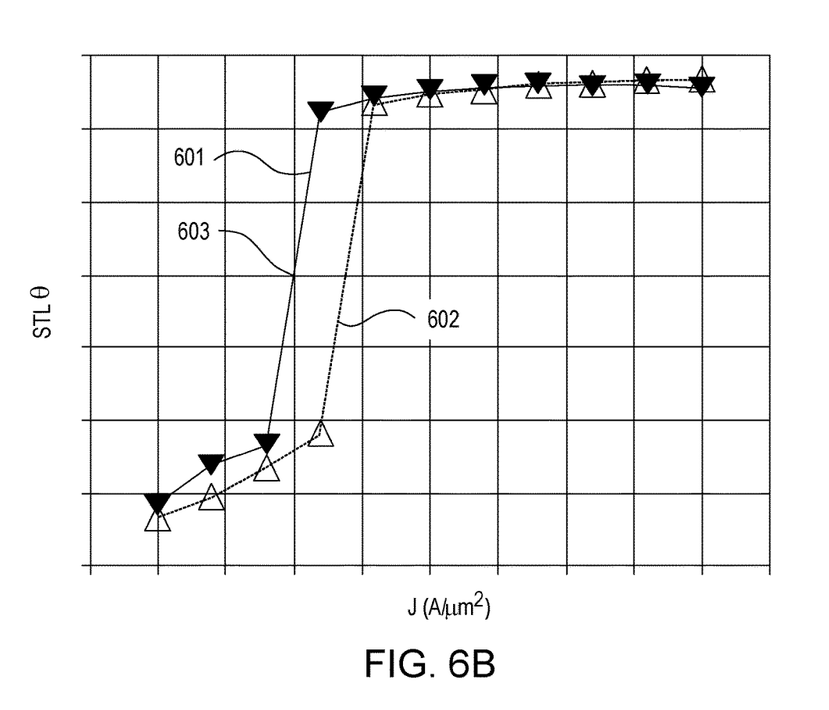

FIGS. 6A and 6B are schematic graphical views of frequency (FIG. 6A) angle (FIG. 6B) of the magnetization $m_c$ of the STL 320, according to one implementation. A first profile 601 in each graph involves a magnetic recording head that includes one or more dusting layers described herein. A second profile 602 in each graph involves a magnetic recording head that does not include the one or more dusting layers.

In FIG. 6A, the vertical axis plots the frequency of the magnetization $m_c$ (in MHz), and the horizontal axis plots the current density J (in A/μm²) of the DC current ($I_{STO}$) applied. As shown by FIG. 6A, using the one or more dusting layers in the first profile 601 exhibits a stronger magnetization frequency for the STL 320 (such as a frequency that is 1.70 or more times larger), particularly immediately before the point of flipping 603 and after the point of flipping 603.

In FIG. 6B, the vertical axis plots the angle θ of the magnetization $m_c$ (in degrees), and the horizontal axis plots the current density J (in A/μm²) of the DC current ($I_{STO}$) applied. As shown by FIG. 6B, using the one or more dusting layers in the first profile 601 exhibits a stronger magnetization angle for the STL 320 (such as an angle that is 1.70 or more times larger), particularly before the point of flipping 603 and immediately after the point of flipping 603. The high angle facilitates flipping the magnetization of the STL 320 at relatively low current densities.

The present disclosure contemplates that such benefits can be achieved while reducing field shunting by 70 Oe or more, such as 130 Oe or more.

In one embodiment, a magnetic recording head includes a write pole, a trailing shield, and a spin polarizing layer (SPL) between the write pole and the trailing shield. The SPL is ferromagnetic. The magnetic recording head includes a free layer between the write pole and the trailing shield. The free layer is ferromagnetic. The magnetic recording head includes a nonmagnetic spacer layer between the SPL and free layer. The magnetic recording head includes a spin torque layer (STL) between the write pole and the trailing shield. The STL is ferromagnetic and a magnetization of the STL is flippable. The magnetic recording head includes a spin polarizing layer (SPL) between the write pole and the trailing shield. The SPL is ferromagnetic. The magnetic recording head includes a barrier layer between the free layer and the STL. The barrier layer is nonmagnetic. The magnetic recording head includes one or more dusting layers between the write pole and the trailing shield. The one or more dusting layers are each formed of iron-chromium (FeCr). The one or more dusting layers include a first set of one or more FeCr layers between the STL and the free layer, and a second set of one or more FeCr layers outwardly of the SPL relative to the free layer. Each of the first set of one or more FeCr layers has a thickness that is less than a thickness of each of the second set of one or more FeCr layers. The first set of one or more FeCr layers includes a first FeCr layer interfacing with a first side of the barrier layer and a second FeCr layer interfacing with a second side of the barrier layer. In one example, the second set of one or more FeCr layers are between the SPL and the write pole, the SPL is between the free layer and the write pole, and the STL is between the free layer and the trailing shield. In one example, the magnetic recording head includes a seed layer between the SPL and the write pole, the seed layer is nonmagnetic, and the second set of one or more FeCr layers includes a third FeCr layer interfacing with a first side of the seed layer and a fourth FeCr layer interfacing with a second side of the seed layer. In one example, the second set of one or more FeCr layers are between the SPL and the trailing shield, the STL is between the free layer and the write pole, and the SPL is between the free layer and the trailing shield. In one example, the magnetic recording head includes a capping layer between the SPL and the trailing shield, the capping layer is nonmagnetic, and the second set of one or more FeCr layers include a third FeCr layer interfacing with a first side of the capping layer and a fourth FeCr layer interfacing with a second side of the capping layer. The magnetic recording head includes electrical circuitry coupled to one or more of the write pole or the trailing shield and configured to generate electron flow between the free layer and the SPL. A thickness of each of the one or more dusting layers is within a range of 0.5 nm to 5.0 nm. An Fe atomic percentage of each of the one or more dusting layers is within a range of 50% to 80%, and a Cr atomic percentage of the one or more dusting layers is within a range of 20% to 50%. The Fe atomic percentage and the Cr atomic percentage added together equal at least 95% of a total atomic percentage for each of the one or more dusting layers. A magnetic recording device including the magnetic recording head is also disclosed.

In one embodiment, a magnetic recording head includes a write pole, a trailing shield, and a first ferromagnetic layer between the write pole and the trailing shield. The magnetic recording head includes a second ferromagnetic layer between the write pole and the trailing shield, a third ferromagnetic layer between the write pole and the trailing shield, and a nonmagnetic spacer layer between the first ferromagnetic layer and the third ferromagnetic layer. The magnetic recording head includes a barrier layer between the first ferromagnetic layer and the second ferromagnetic layer. The barrier layer is nonmagnetic. The magnetic recording head includes one or more dusting layers between the write pole and the trailing shield. The one or more dusting layers are each formed of iron-chromium (FeCr). The magnetic recording head includes electrical circuitry coupled to one or more of the write pole or the trailing shield and configured to generate electron flow between the first ferromagnetic layer and the third ferromagnetic layer. The first ferromagnetic layer is a free layer, the second ferromagnetic layer is a spin torque layer (STL), and the third ferromagnetic layer is a spin polarizing layer (SPL). The one or more dusting layers includes a first set of one or more FeCr layers between the second ferromagnetic layer and the first ferromagnetic layer, and a second set of one or more FeCr layers outwardly of the third ferromagnetic layer relative to the first ferromagnetic layer. In one example, a thickness of each of the first set of one or more FeCr layers is less than 2.0 nm, and a thickness of each of the second set of one or more FeCr layers is within a range of 2.0 nm to 3.0 nm. A magnetic recording device including the magnetic recording head is also disclosed.

In one embodiment, a magnetic recording head includes a write pole, a trailing shield, and a spin polarizing layer (SPL) between the write pole and the trailing shield. The SPL is ferromagnetic. The magnetic recording head includes a free layer between the write pole and the trailing shield. The free layer is ferromagnetic. The magnetic recording head includes a nonmagnetic spacer layer between the SPL and free layer. The magnetic recording head includes a spin torque layer (STL) between the write pole and the trailing shield. The STL is ferromagnetic and a magnetization of the STL is flippable. The magnetic recording head includes a spin polarizing layer (SPL) between the write pole and the trailing shield. The SPL is ferromagnetic. The magnetic recording head includes a spin torque reducing means between the free layer and the STL for reducing or eliminating spin torque applied to the STL. The magnetic recording head includes one or more dusting layers between the write pole and the trailing shield. The one or more dusting layers are each formed of iron-chromium (FeCr). A magnetic recording device including the magnetic recording head is also disclosed.

Benefits of the present disclosure include reduced shunting of magnetic fields; reduced or eliminated spin torque (or negative torque) between free layers and STL's; enhanced directions, frequencies, and angles of magnetizations of ferromagnetic layers; enhanced device performance (e.g., PMR writing) and enhanced storage capacities; reduced layer thicknesses and device sizes (e.g., trailing gap sizes); reduced or eliminated cross-track forces across one or more spin torque blocking layers; and reduced current for flipping magnetizations.

It is contemplated that one or more aspects disclosed herein may be combined. Moreover, it is contemplated that one or more aspects disclosed herein may include some or all of the aforementioned benefits. As an example, one or more of the aspects, components, features, operations, and/or properties of the hard disk drive 10, the read-write head 29, the magnetic recording head 300, the magnetic recording head 400, the magnetic recording head 450, the STO 190, the STO 290, the STO 390, and/or the STO 490 may be combined, such as combined for a magnetic recording head (for example a write head of an HDD).

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   a write pole;
   a trailing shield;
   a spin polarizing layer (SPL) between the write pole and the trailing shield, wherein the SPL is ferromagnetic;
   a free layer between the write pole and the trailing shield, wherein the free layer is ferromagnetic;
   a nonmagnetic spacer layer between the SPL and free layer;
   a spin torque layer (STL) between the write pole and the trailing shield, wherein the STL is ferromagnetic and a magnetization of the STL is flippable;
   a barrier layer between the free layer and the STL, wherein the barrier layer is nonmagnetic; and
   one or more dusting layers between the write pole and the trailing shield, wherein the one or more dusting layers are each formed of iron-chromium (FeCr), wherein the one or more dusting layers further comprise a first set of one or more FeCr layers outwardly of the SPL relative to the free layer, and a second set of one or more FeCr layers between the STL and the free layer.

2. The magnetic recording head of claim 1, wherein each of the second set of one or more FeCr layers has a thickness that is less than a thickness of each of the first set of one or more FeCr layers.

3. The magnetic recording head of claim 1, wherein the second set of one or more FeCr layers comprise a first FeCr layer interfacing with a first side of the barrier layer and a second FeCr layer interfacing with a second side of the barrier layer.

4. The magnetic recording head of claim 1, wherein the first set of one or more FeCr layers are between the SPL and the write pole, the SPL is between the free layer and the write pole, and the STL is between the free layer and the trailing shield.

5. The magnetic recording head of claim 4, further comprising:
   a seed layer between the SPL and the write pole, wherein the seed layer is nonmagnetic, and
   wherein the first set of one or more FeCr layers comprise a third FeCr layer interfacing with a first side of the seed layer and a fourth FeCr layer interfacing with a second side of the seed layer.

6. The magnetic recording head of claim 1, wherein the first set of one or more FeCr layers are between the SPL and the trailing shield, the STL is between the free layer and the write pole, and the SPL is between the free layer and the trailing shield.

7. The magnetic recording head of claim 6, further comprising:
   a capping layer between the SPL and the trailing shield, wherein the capping layer is nonmagnetic, wherein the first set of one or more FeCr layers comprise a third FeCr layer interfacing with a first side of the capping layer and a fourth FeCr layer interfacing with a second side of the capping layer.

8. The magnetic recording head of claim 1, further comprising electrical circuitry coupled to one or more of the write pole or the trailing shield and configured to generate electron flow between the free layer and the SPL.

9. The magnetic recording head of claim 1, wherein a thickness of each of the one or more dusting layers is within a range of 0.5 nm to 5.0 nm.

10. The magnetic recording head of claim 1, wherein an Fe atomic percentage of each of the one or more dusting layers is within a range of 50% to 80%, and a Cr atomic percentage of each of the one or more dusting layers is within a range of 20% to 50%.

11. The magnetic recording head of claim 10, wherein the Fe atomic percentage and the Cr atomic percentage added together equal at least 95% of a total atomic percentage for each of the one or more dusting layers.

12. A magnetic recording device comprising the magnetic recording head of claim 1.

13. A magnetic recording head, comprising:
    a write pole;
    a trailing shield;
    a first ferromagnetic layer between the write pole and the trailing shield;

a second ferromagnetic layer between the write pole and the trailing shield;

a third ferromagnetic layer between the write pole and the trailing shield;

a nonmagnetic spacer layer between the first ferromagnetic layer and the third ferromagnetic layer;

a barrier layer between the first ferromagnetic layer and the second ferromagnetic layer, wherein the barrier layer is nonmagnetic;

one or more dusting layers between the write pole and the trailing shield, wherein the one or more dusting layers are each formed of iron-chromium (FeCr), wherein the one or more dusting layers further comprise a first set of one or more FeCr layers outwardly of the third ferromagnetic layer relative to the first ferromagnetic layer, and a second set of one or more FeCr layers between the second ferromagnetic layer and the first ferromagnetic layer; and electrical circuitry coupled to one or more of the write pole or the trailing shield and configured to generate electron flow between the first ferromagnetic layer and the third ferromagnetic layer.

14. The magnetic recording head of claim 13, wherein the first ferromagnetic layer is a free layer, the second ferromagnetic layer is a spin torque layer (STL), and the third ferromagnetic layer is a spin polarizing layer (SPL).

15. The magnetic recording head of claim 13, wherein:
a thickness of each of the second set of one or more FeCr layers is less than 2.0 nm; and a thickness of each of the first set of one or more FeCr layers is within a range of 2.0 nm to 3.0 nm.

16. A magnetic recording device comprising the magnetic recording head of claim 13.

17. A magnetic recording head, comprising:
a write pole;
a trailing shield;
a spin polarizing layer (SPL) between the write pole and the trailing shield, wherein the SPL is ferromagnetic;
a free layer between the write pole and the trailing shield, wherein the free layer is ferromagnetic;
a nonmagnetic spacer layer between the SPL and free layer;
a spin torque layer (STL) between the write pole and the trailing shield, wherein the STL is ferromagnetic and a magnetization of the STL is flippable;
a spin torque reducing means between the free layer and the STL for reducing or eliminating spin torque applied to the STL; and
one or more dusting layers between the write pole and the trailing shield, wherein the one or more dusting layers are each formed of iron-chromium (FeCr), wherein the one or more dusting layers comprise a first set of one or more FeCr layers outwardly of the SPL relative to the free layer, and a second set of one or more FeCr layers between the free layer and the STL.

18. A magnetic recording device comprising the magnetic recording head of claim 17.

* * * * *